United States Patent [19]
Hecht et al.

[11] Patent Number: 5,712,425
[45] Date of Patent: Jan. 27, 1998

[54] DEVICE FOR MEASURING THE MASS OF A FLOWING MEDIUM

[75] Inventors: Hans Hecht, Korntal-Muenchingen; Heinz Rilling, Eberdingen; Stefan Lehenberger, Ludwigsburg; Uwe Konzelmann, Asperg, all of Germany

[73] Assignee: Robert Bosch GmbH, Stuttgart, Germany

[21] Appl. No.: 682,599

[22] PCT Filed: Oct. 24, 1995

[86] PCT No.: PCT/DE95/01477

§ 371 Date: Aug. 26, 1996

§ 102(e) Date: Aug. 26, 1996

[87] PCT Pub. No.: WO96/16317

PCT Pub. Date: May 30, 1996

[30] Foreign Application Priority Data

Nov. 24, 1994 [DE] Germany .................. 44 41 874.4

[51] Int. Cl.$^6$ .................................................. G01M 19/00
[52] U.S. Cl. ................................ 73/118.2; 73/202.5
[58] Field of Search ........................... 73/118.2, 202, 73/202.5

[56] References Cited

U.S. PATENT DOCUMENTS

| | | | |
|---|---|---|---|
| 3,968,686 | 7/1976 | O'Neal | 73/207 |
| 4,173,150 | 11/1979 | Gray | 73/714 |
| 4,215,565 | 8/1980 | Zanker | 73/30 |
| 4,393,697 | 7/1983 | Sato et al. | 73/118 |
| 4,449,401 | 5/1984 | Kaiser et al. | 73/202 |
| 4,709,581 | 12/1987 | Nishimura et al. | 73/202 |
| 5,467,648 | 11/1995 | Igarashi et al. | 73/202.5 |

*Primary Examiner*—George M. Dombroske
*Assistant Examiner*—Jewel V. Artis
*Attorney, Agent, or Firm*—Edwin E. Greigg; Ronald E. Greigg

[57] ABSTRACT

A device for measuring the mass of a flowing medium by use of a temperature-dependent measuring resistor bathed by the flowing medium and accommodated in a measuring channel. The device has a flow obstacle, embodied in the form of a trip edge, upstream of the measuring element in the region of an inlet opening of the measuring channel, so as to create a chronologically and spatially stable separation zone in the region of the trip edge, thereby preventing chronologically and spatially unstable separation zones and makes it possible to attain a reduction in measuring signal noise. The invention is contemplated for measuring the mass of a flowing medium, especially for measuring the aspirated air mass in internal combustion engines.

7 Claims, 3 Drawing Sheets

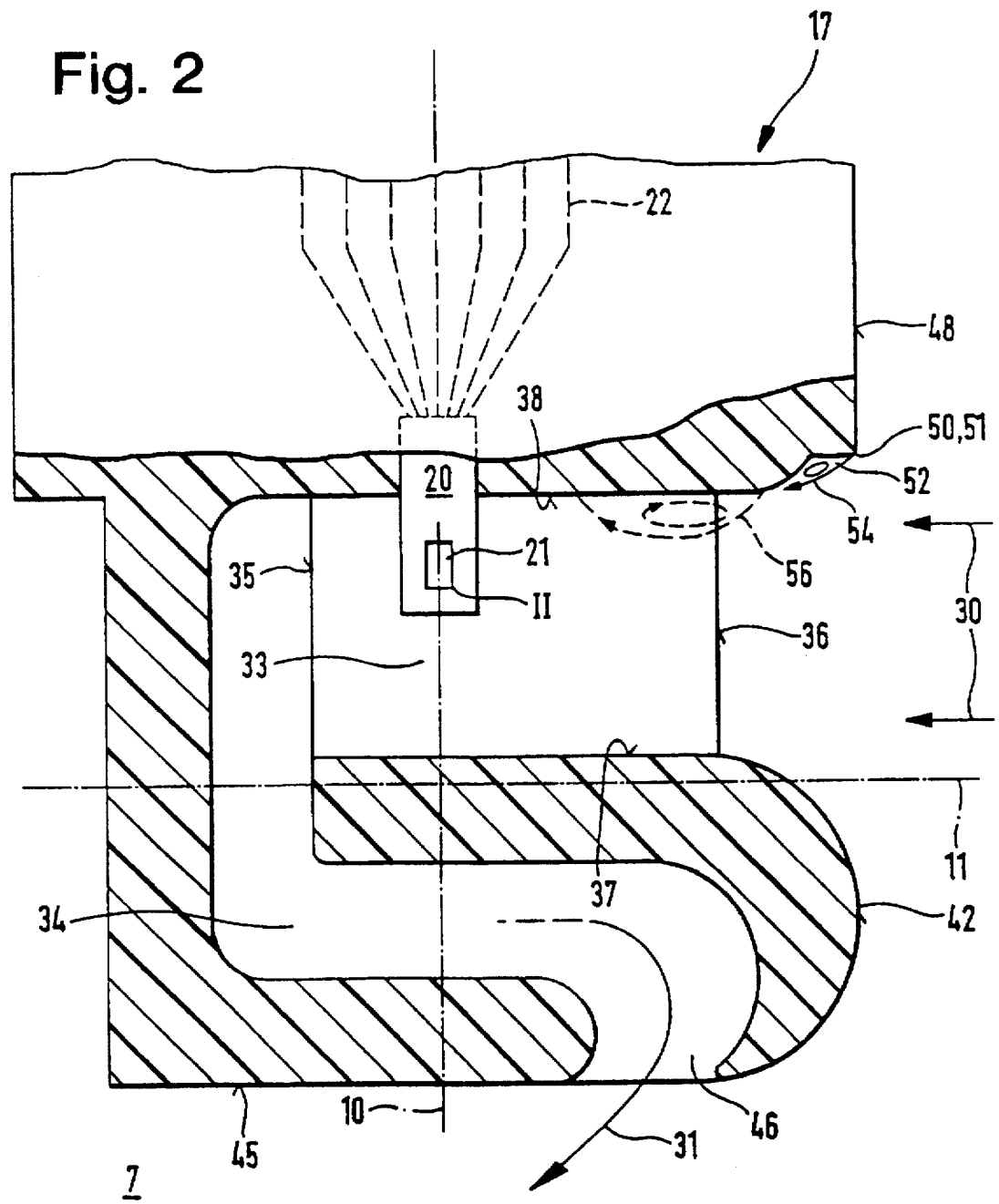

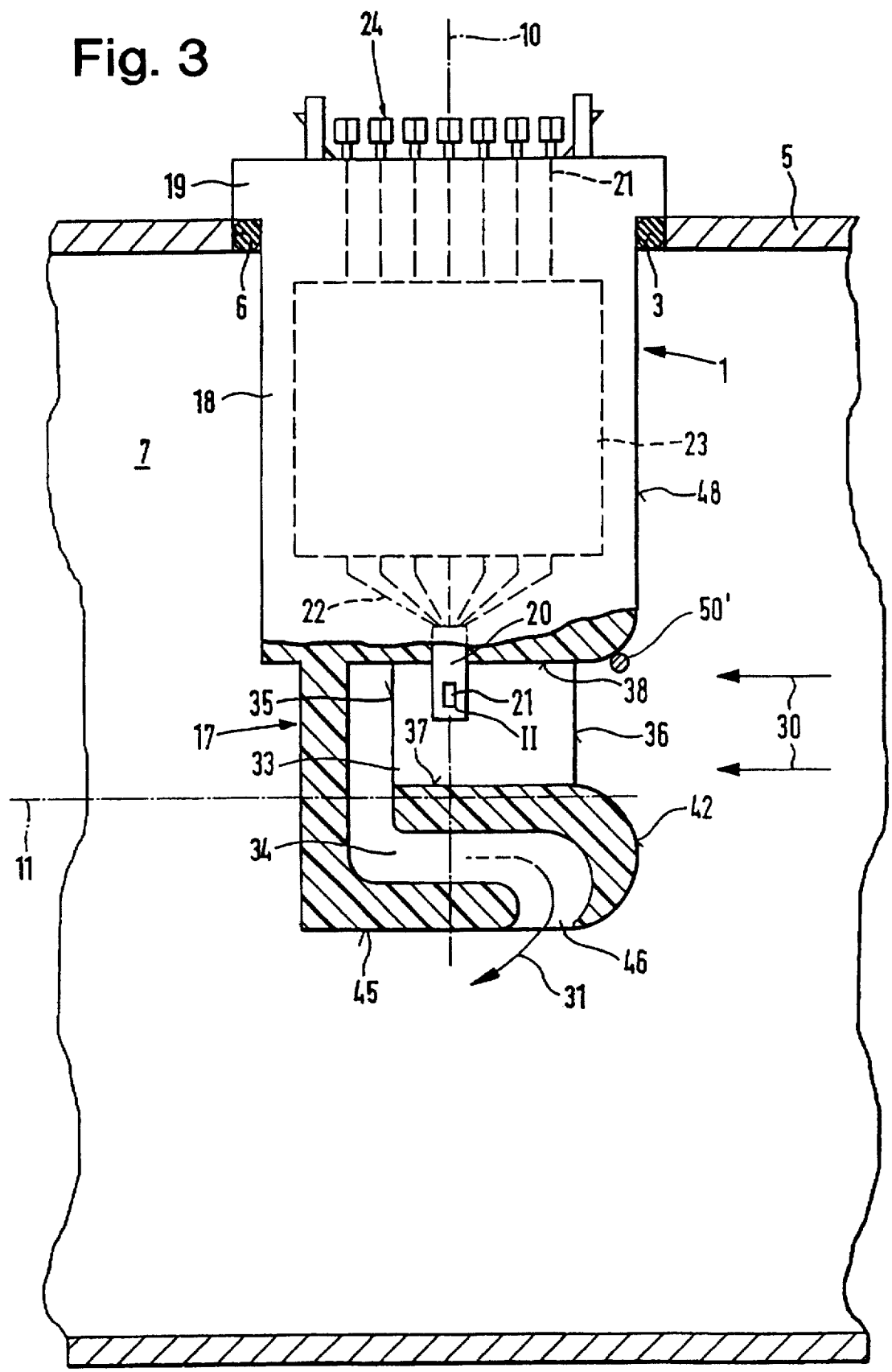

5,712,425

1

DEVICE FOR MEASURING THE MASS OF A FLOWING MEDIUM

PRIOR ART

The invention is based on a device for measuring the mass of a flowing medium, or for a flow rate meter. German Patent Application P 44 07 209.0 (U.S. patent application Ser. No. 08/545,583, filed Nov. 3, 1995) sets forth a device that has a carrier body which extends crosswise to the flow of the medium and which is introduced in plug-in fashion into an opening made in a boundary wall of the flow. The boundary wall is for instance a wall of an intake tube through which an internal combustion engine aspirates air from its surroundings. The carrier body is elongated in shape, and in its free end region that protrudes into the flowing medium, it has a measuring channel through which the medium flows. A temperature-dependent measuring resistor, embodied by so-called micromechanical construction, is accommodated in the measuring channel. Such measurement elements have a sensor zone, produced on a platelike carrier by etching out a silicon wafer; the sensor zone, together with a plurality of resistor layers, forms at least one temperature-dependent measuring resistor. The sensor zone encloses only a small recess on the carrier and is extremely slight in thickness, making it capable, with a fast reaction time, of detecting changes in the flow velocity, such as changes in the mass of the flowing medium.

In engine operation, the opening and closing of the engine inlet valves causes a highly pulsating flow to prevail in the intake tube, which as in nearly all technical flows is turbulent in nature. The influence of the pulsations in the flow is partly damped by accommodating the measuring element in the measuring channel, but because of the turbulence in the flow, especially with micromechanical measuring elements, the measurement signal output by the measuring element has so-called background noise. The background noise of the electrical measurement signal output by the measuring element makes precise measurement of the flow velocity more difficult, however.

In the aforementioned prior art, the boundary walls of the measuring channel downstream of an inlet opening of the measuring channel are made rounded, to achieve a maximally unimpeded inflow without flow detachments into the measuring channel and a parallel flow in the measuring channel, especially in the region of the measuring element. However, this is only limitedly attainable with the rounded boundary walls, since the desired small structural size of the device makes the inlet region of the measuring channel too short in the flow direction to allow optimal inflow without flow separations, especially when the flow is turbulent. Under certain flow conditions, flow separations can therefore occur especially in the inlet region of the measuring channel; they are intrinically unstable chronologically and affect the flow in the region of the measuring element in such a way as to increase the measuring signal noise and hence worsen the outcome of measurement.

ADVANTAGES OF THE INVENTION

The device of the invention has the advantage over the prior art that the device has markedly reduced measuring signal noise, thus enabling an improvement in the outcome of measurement, compared with the prior art.

By the provisions recited herein, advantageous further features of and improvements to the device as defined hereinafter are possible.

BRIEF DESCRIPTION OF THE DRAWINGS

One exemplary embodiment of the invention is shown in simplified form in the drawings and described in further detail in the ensuing description. FIG. 2 shows an enlarged detail of FIG. 1; and FIG. 3 is a modification of FIGS. 1 and 2 which includes a trip wire.

DETAILED DESCRIPTION OF THE EXEMPLARY EMBODIMENT

Figure 1:
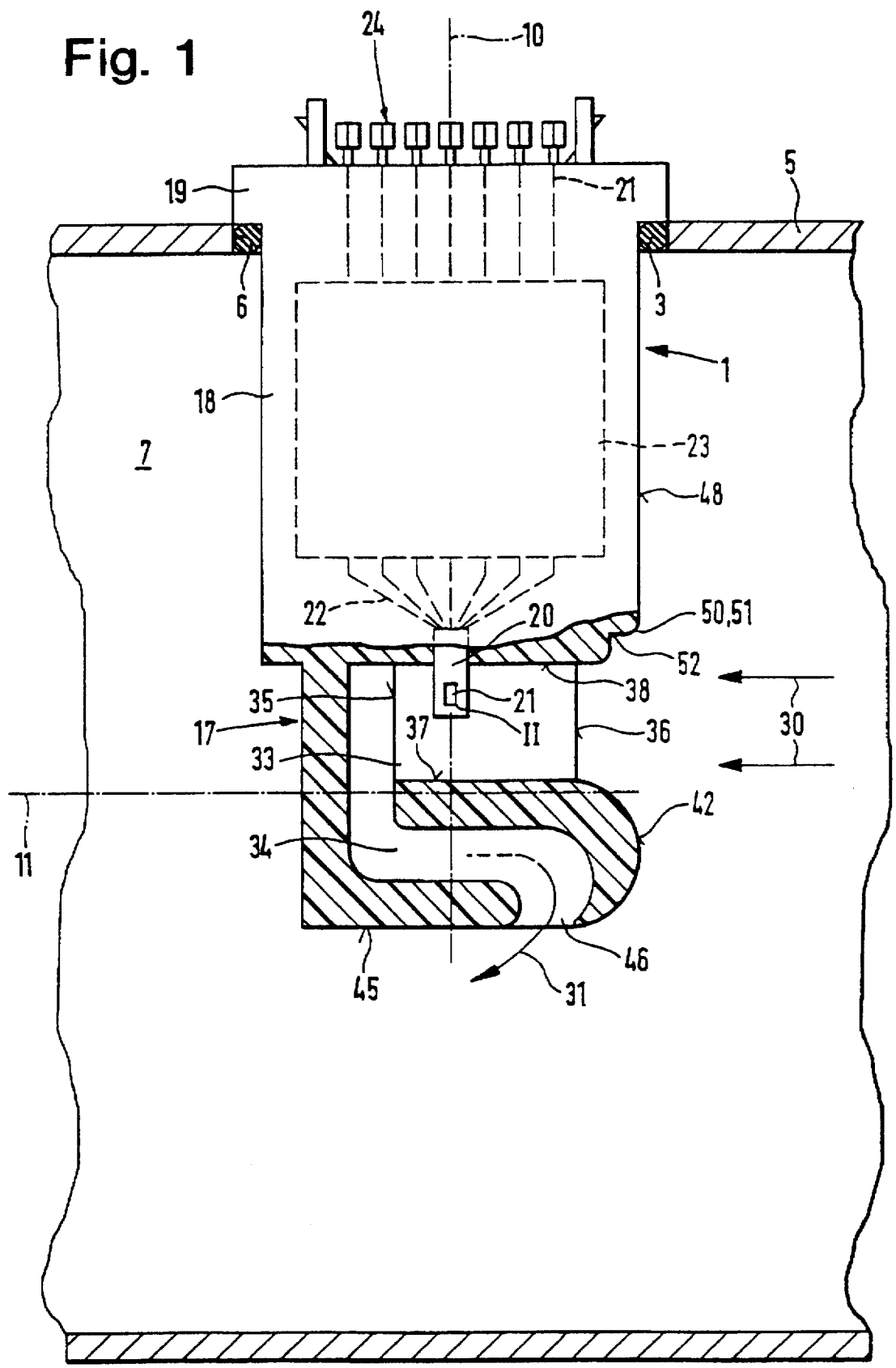
FIG. 1, partly in section, shows a side view of a device embodied according to the invention.

FIG. 1, partly in section, shows a side view of a device 1 that is used to measure the mass of a flowing medium, in particular the aspirated air mass of internal combustion engines. The device 1 has preferably a slender blocklike shape extending radially longitudinally in the direction of a longitudinal axis 10 and is introduced for instance in plug-in fashion into an opening 6 made in a boundary wall 5. The boundary wall 5 is for instance a wall of an intake tube through which the engine aspirates air from its surroundings. The boundary wall 5 defines a flow cross section 7, which in the case of a cylindrical intake tube, for instance, has an approximately circular cross section, in which center a center axis 11 extends in the axial direction, parallel to the boundary wall 5, the center axis being oriented at right angles to the longitudinal axis 10 of the device 1. The device 1 is sealed off in the boundary wall 5 by means of a sealing ring 3 and is tightly joined to the boundary wall, for instance by means of a screw connection, not shown. With a part hereinafter called the measurement part 17, the device 1 protrudes into the flowing medium; the measuring part 17 is for instance divided symmetrically by the center axis 11 approximately in the middle of the flow cross section 7, so that the flowing medium can flow, with as little peripheral impediment from the boundary wall 5, to a temperature-dependent measuring resistor 20 accommodated in the measuring part 17. In the exemplary embodiment of FIGS. 1 and 2, the medium flows from right to left, and the flow direction is identified by corresponding arrows 30.

The device is composed in one piece of the measuring part 17, a carrier part 18, and a mounting part 19 and is produced from plastic, for instance, by plastic injection molding. The measuring element 20 can be made by so-called micromechanical construction by etching out a semiconductor body, for instance a silicon wafer; its design is of the kind found for instance in Published German Patent Application DE-OS 42 19 454. The measuring element 20 has a diaphragmlike sensor zone 21, produced by etching, that is bounded by a line 11 in FIGS. 1 and 2. The sensor zone 21 is extremely slight in thickness and has a plurality of resistor layers, also created by etching, which form at least one temperature-dependent measuring resistor and for instance one heating resistor. It is also possible for the measuring element 20 to be in the form of a so-called hot-film sensor element, whose design can be found for instance in Published German Patent Application DE-OS 36 38 138. Hot-film sensor elements of this kind likewise have individual resistor layers, applied to a platelike substrate, that include at least one temperature-dependent measuring resistor and for instance at least one heating resistor. The individual resistor layers of the measuring element 20 or of the sensor zone 21 are electrically connected, by means of connection lines 22 extending in the interior of the device 1, to an electronic evaluation circuit 23 shown in dashed lines in FIG. 1. The electronic evaluation circuit 23 includes a bridgelike resistance measuring circuit, for instance. The evaluation circuit 23 is accommodated for instance in the carrier part 18 or the mounting part 19 of the device 1. With a plug connection 24 provided on the mounting part 19, the electrical signal furnished by the evaluation circuit 23 can be supplied for evaluation, for instance to a further electronic control unit that among other things controls functions of the electronic idling controller or of the engine management system. The function and layout of temperature-dependent measuring resistors will not be described in detail here, because one skilled in the art can find this in the prior art.

The measuring part 17 of the device 1 is block-shaped, for instance, and has a measuring channel 33 which extends axially within the measuring part 17 and a deflection channel 34, which is S-shaped, for instance. The measuring channel 33 extends axially in the direction of the center axis 11 in the measuring part 17, from an inlet opening 36, for instance of rectangular cross section, to a mouth 35. The measuring channel 33 is bounded by a top face 38, more-remote from the center axis 11, and a bottom face 37 closer to the center axis 11, and by two side faces. Instead of disposing the measuring channel 33 eccentrically relative to the center axis 11 it is also possible to dispose it centrally or in the region of the center axis 11 of the boundary wall 5. The platelike measuring element 20 is oriented in the measuring channel 33 with its greatest length pointing radially in the direction of the longitudinal axis 10 and is symmetrically divided by this axis. The measuring element 20 is retained by one if its narrow ends on one side in the carrier part 18 at the top face 38, so that it is bathed by the medium on both its side faces approximately parallel to the center axis 11. The medium flows from the inlet openings 36 of the measuring channel 33 to the measuring element 20 and from it into the deflection channel 34, and then in a radial direction, as indicated by an arrow 31 in FIGS. 1 and 2, leaves the deflection channel 34 through an outlet opening 46. The medium flowing out of the outlet opening 46 then mixes again with the medium that bathes the device 1. Like the deflection channel 34, the outlet opening 46 is rectangular in cross section, for instance; it is provided on lower outer face 45 of the measuring part 17 that is oriented parallel to the center axis 11. On the right, crosswise to the lower outer face 45, the rectangular outlet opening 46 is adjoined by a boundary face 42 of the measuring part 17 that points counter to the flow 30 and leads in a rounded course upstream of the inlet opening 36 from the lower outer face 45 to the lower face 37 of the measuring channel 33 as far as the inlet opening 36.

According to the invention, a flow obstacle 50 is provided upstream of the measuring element 20, in the region of the inlet opening 36 of the measuring channel 33; in the exemplary embodiment this obstacle is in the form of a trip edge 51. The trip edge 51, which causes a sharp-edged deflection of the flow, is provided on the top face 38, on an end of the measuring channel 33 that is open toward the flow 30. The end of the measuring channel 33 is bounded by an end face 48 of the mounting part 18 of the device 1 and by the boundary face 42. The end face 48, which for instance is rectangular, faces into the flow 30 and extends parallel to the longitudinal axis 10 from the measuring part 17 to the boundary wall 5. Downstream of the trip edge 51 provided in the vicinity of the end face 48, a groovelike indentation 52 is recessed out of the top face 38 of the measuring channel 33, extending crosswise to both the longitudinal axis 10 and the center axis 11. The groovelike indentation 52 accordingly protrudes vertically to the plane of the drawing, into the plane of the drawing in FIGS. 1 and 2, and has a length that is approximately equal to the width of the opening cross section of the inlet opening 36 of the measuring channel 33.

As shown in FIG. 2, which is an enlarged view of the measuring part 17, the trip edge 51 creates a separation zone 54, shown in FIG. 2, which substantially occupies the region of the indentation 52. The separation zone 54 of the flow is relatively stable both chronologically and spatially and always occurs at the same point, with the effect that the chronologically unstable separation zones 56 that appear at various points in the devices of the prior art are prevented or at least greatly attenuated. Such sporadic separation zones 56, as shown in dashed lines in FIG. 2, cause disruptions in the flow that lead to an increase in so-called background noise of the electrical measuring signal output by the measuring element 20. By means of the trip edge 51, that is, the stable separation zone 54, such disruptions are avoided and hence the background noise is reduced. It is also possible to provide differently shaped flow obstacles instead of the trip edge 51, for instance in the form of a so-called trip wire known in the field of fluid mechanics. Trip wires 50' that protrudes into the flow are mounted like trip edges at a certain point on a body in order to bring about a defined separation zone in the flow by causing a local increase in the flow resistance on the body, downstream of the trip edge or trip wire.

To that end, the size of the flow obstacle approximately corresponds to the thickness of the boundary layer at the point of the intended flow obstacle; as a result, an especially high pressure gradient toward the wall is created downstream of the flow obstacle, so that a chronologically and spatially stable separation zone forms downstream of the flow obstacle.

The foregoing relates to preferred exemplary embodiments of the invention, it being understood that other variants and embodiments thereof are possible within the spirit and scope of the invention, the latter being defined by the appended claims.

What is claimed is:

1. A device for measuring the mass of a flowing medium, in particular an aspirated air mass of an internal combustion engine, comprising a carrier body that protrudes into the medium flow from a wall that bounds the flow and extends crosswise to a flow of the medium, a measuring channel (33) is provided in the carrier body through which the flowing medium flows, said measuring channel includes an inlet opening (36), a temperature-dependent measuring resistor, said temperature-dependent measuring resistor is accommodated in said measuring channel, a flow obstacle (50), said flow obstacle is provided upstream of a measuring element (20) supported on the carrier body in a region of the inlet opening (36) of said measuring channel, said flow obstacle (50) creates a defined flow separation (54) of said flowing medium that is operative in the measuring channel (33) in order to reduce signal noise.

2. A device in accordance with claim 1, in which the flow obstacle (50) is a part of the carrier body provided in a region of the inlet opening (36) of the measuring channel (33).

3. A device in accordance with claim 2, in which the flow obstacle (50) is embodied in the form of a trip edge (51).

4. A device in accordance with claim 1, in which the measuring channel includes a top face (38), a bottom face (37) and side faces each of which have an outer edge that together forms an inlet opening (36), whereby said flow obstacle is provided along said outer edge of said top face (38) of said inlet opening.

5. A device in accordance with claim 4, in which downstream of the trip edge (51), an indentation (52) is recessed out of said outer edge of said top face (38) that bounds the measuring channel (33).

6. A device in accordance with claim 4, in which the flow obstacle (50) is embodied in the form of a trip wire 50' secured along the outer edge of said top face (38).

7. A device in accordance with claim 6, in which the trip wire is provided in a region of an inlet opening (36) of the measuring channel (33).

* * * * *